No Printed Specification Available
8663X
S. Chapman.
Car Truck.
No
Patented Mar. 2, 1835.
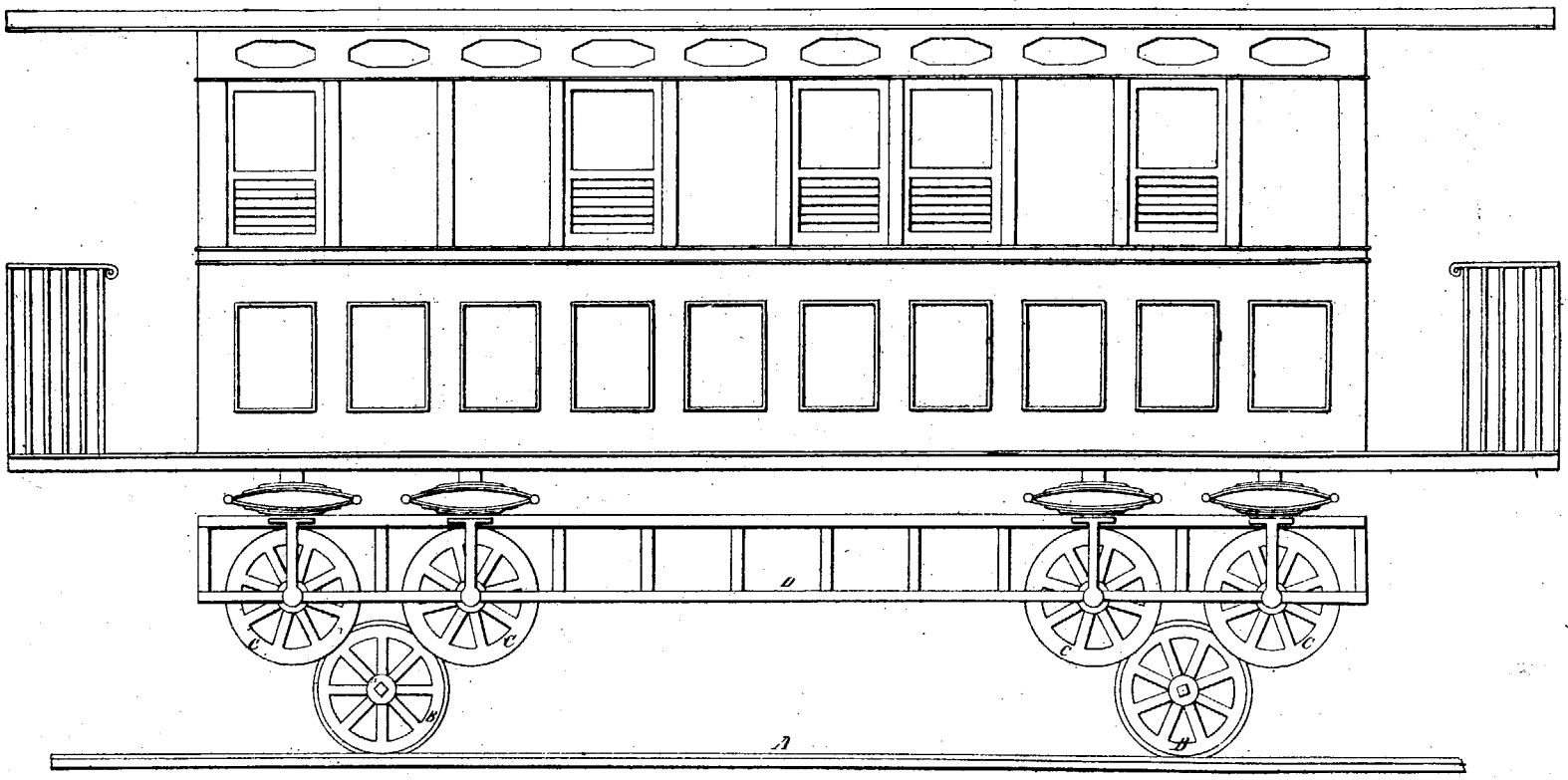

8663X

Samuel Chapman, Junr of Windsor, Massachusetts,

Letters Patent.

The schedule referred to in these Letters Patent and making part of the same containing a description in the words of the said Samuel Chapman Junr himself of his improvement in the mode of sustaining the weight and applying the power in wheeled carriages. —

To all whom it may concern.

Be it known that I Samuel Chapman Junr of Windsor in the County of Berkshire and State of Massachusetts, have invented an improvement in the mode of sustaining the weight and applying the power in wheeled carriages. And I do hereby declare that the following is a full and exact description thereof.

My invention is applicable either to carriages upon common roads, or upon rail roads, and also to those with two or with four Wheels, and consists in suspending the load so that it shall act against and be sustained by the periphery of wheels upon the same axis to which the road wheels are attached or upon the peripheries of the road wheel themselves when the invention is applied to rail roads. In constructing rail road cars upon the principle adopted by me, the wheels are to be made and placed upon axles in the usual way, one or both of these wheels however may be left free to revolve upon the axle to allow of a more free motion upon curves than when both wheels are firmly fixed. The axles themselves are not to be attached in any way to the car, no boxes, or bearings, such as are ordinarily employed being required or admissible, the whole connection between the car and the road wheels being made through the intervention of large friction or driving wheels, to be presently described.

To a frame which is to sustain the body of the car, or carriage, I attach friction or driving wheels, a pair to each car wheel in such a situation that their peripheries may rest upon the periphery or tread of the car or road wheel at about ninety degrees from each other, and equi distant or nearly so

8663X from the apex of the car wheel. The faces of these friction or driving wheels are to be adapted to those of the car wheels, and they may if found necessary be furnished with flanches similar to them, and embracing their unflanched sides It is manifest, that in a car thus constructed, the whole weight thereof, with its load will rest upon the upper part of the periphery of the road wheels, their axles serving no other purpose than to keep each pair of wheels in the proper position, as related to each other.

In applying the same principles to carriages on common roads it will not be proper to allow the faces of the friction or driving wheels to run in contact with the road wheels; but in this case I fix secondary wheels upon the same hubs with the road wheels and usually at a small distance within them, These secondary wheels must be so much smaller in diameter than the road wheels as may be necessary to keep them free from the dirt and obstructions upon the road, They have in general flanches rising from each of their sides above their faces, so as to form a groove to receive and check the lateral motion of the friction or driving wheels which are to rest upon them; they revolve on gudgeons affixed to the frame work of the carriage and transferring the bearing of the load on the peripheries of those secondary wheels, which being firmly fixed on the same hubs on which the road wheels are placed produce the same effect as though they actually rested upon the road wheels, abating the difference in their diameters.

In a four wheeled carriage which must be made capable of turning abrupt curves, the frame work which sustains the friction or driving wheels of the fore and hind wheels, must be detached from each other, allowing them to play upon a perch in the common manner, or in any other which will admit of the same effect being produced.

In order to keep the wheels in their places upon common roads where they are liable to sudden jolts, I place two small friction wheels upon the frame work of the carriage at situations diametrically opposite or nearly so to the friction or driving wheels, these friction wheels need not be more than five or six inches in diameter, as, although they are near to, they do not actually touch the faces of the secondary wheels, unless they are brought into contact to check the tendency of the upper or driving wheels to move out of their place in consequence of the road wheels meeting with obstructions against which they strike I have thus fully exemplified the principle upon which I intend to construct cars or carriages either upon rail or common roads, & it is my design also to apply the same to Locomotives; but in doing this, the driving or friction wheels and also the secondary wheels are to be furnished with teeth or cogs upon their peripheries so that the action of the Engine may not cause them to slip round upon each other.

These secondary wheels may be cast and made one with the road wheels.

What I claim as my invention and for which I ask Letters Patent is the sustaining of and applying the power to carriages or Locomotives upon the peripheries of road or secondary wheels upon the principle, and in the manner herein set forth; not intending however to confine myself to the precise arrangement of the several parts, as set forth but to vary the same in any way which I may find convenient whilst I attain similar ends by means substantially the same,

Samuel Chapman Jun.

Witnesses
Sam. Stettenius
Thomas Woodward

Ex. d.
ChW.

(Drawing)

1092 h.d.

Patented March 2, 1835)